United States Patent Office 2,831,833
Patented Apr. 22, 1958

2,831,833

ACRYLAMIDE DERIVATIVES, THEIR POLYMERS AND METHODS OF PRODUCING THEM

Benjamin F. Aycock, Wyncote, and Elinor M. Hankins, Philadelphia, Pa., assignors to Rohm & Haas Company, Philadelphia, Pa., a corporation of Delaware No Drawing. Application July 18, 1955
Serial No. 522,880

17 Claims. (Cl. 260—77.5)

This invention concerns new amides, as well as polymers thereof and methods of producing them, having the structure of Formula I:

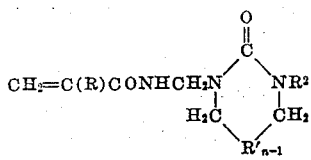

where R is selected from the group consisting of H and $CH_3$, $n$ is an integer having a value of 1 to 2, R' is selected from $-CH_2-$ and $-NR^3-$ where $R^3$ is hydroxyethyl or an alkyl group of 1 to 4 carbon atoms, and $R^2$ is selected from H and $CH_2OH$ and $CH_2OCH_3$.

The compounds of this invention are useful as chemical intermediates. They react, for example, at the double bond with many compounds having reactive hydrogen. For example, they react by addition with alcohols, mercaptans, primary or secondary amines, nitroalkanes, malonates, acetoacetates, etc. or with sodium bisulfite. They react with alkylating and acylating agents to give complex compounds. The polymers and copolymers are useful in coating and impregnating compositions and textile finishing compositions, as adhesives, as paper-treating agents, and as additives for fiber-spinning dopes, such as cellulose acetate dopes, to improve the properties of fibers and films formed therefrom. The monomers and polymers, in which $R^2$ is H, react readily with formaldehyde to form highly useful initially water-soluble condensates that are convertible by heat to water-insoluble and infusible resinous solids.

The monomers and polymers of the present invention may be made in several ways. A preferred method of producing the monomers is to react an N-methylolacrylamide or N-methylolmethacrylamide with a cyclic urea, such as N,N'-ethyleneurea, N,N'-trimethyleneurea, or a 5-alkyl-tetrahydro-s-triazone-2, such as the 5-methyl, 5-ethyl, 5-propyl or 5-butyl substituted tetrahydro-s-triazone-2. The mole ratio of the cyclic urea to the methylolacrylamide may vary from 1.25:1 to 3:1. The reaction may be carried out in polar solvents for the initial reactants, which solvent may also dissolve the condensate obtained. Such solvents as water, dimethylformamide, lower alcohols, such as methanol, or ethanol, and acetonitrile may be used. The reaction is carried out on the acid side at a pH of 2 to 5, preferably about 3. The temperature may be from room temperature, such as 25° C. to 80° C. Preferably the reaction is carried out between 50° and 60° C. The temperature may be controlled by initially heating to the desired temperature or by allowing the exothermic reaction to elevate the temperature to the desired extent. Cooling means may be provided to maintain the temperature in the proper range or in the preferred range, and the control of the temperature may be facilitated by a gradual addition of one reactant to the other. For example, the methylolacrylamide may be added to the cyclic urea. It may be desirable, especially when elevated temperatures prevail during reaction to incorporate a small amount of a polymerization inhibitor, such as hydroquinone, in the reaction medium.

An alternate route for producing the monomeric compounds in which $R^2$ is $-CH_2OH$ is to react acrylamide or methacrylamide with a methylolated cyclic urea, such as dimethylol-N,N'-ethyleneurea, dimethylol-N,N'-trimethyleneurea, or dimethylol-5-alkyl-tetrahydro-s-triazone-2. In carrying out this reaction, it is preferable to have an excess of the cyclic urea, but the mole ratio of the methylolated cyclic urea to the acrylamide or methacrylamide may be from 0.75:1 to 3:1. The reaction may be carried out in the solvents mentioned above, such as water, dimethylformamide, alcohols and the like. The reaction is carried out on the acid side at a pH between 2 and 5 and preferably about 3. Again, the reaction may be carried out at about room temperature to 80° C. at a period that is inversely proportional to the reaction temperature, such as from one hour at 80° C. to about 16 hours or more at 25° C. The temperature may be controlled as in the previous system by heating, cooling or gradual addition of one reactant to the other and, as before, a polymerization inhibitor may be present.

To produce the polymers, a polymer (including homopolymers and copolymers as well) of acrylamide or methacrylamide may be reacted with a methylolated cyclic urea, such as one of the several mentioned in the preceding paragraph. In this case, the polymer may be mixed with the cyclic urea, from 0.75 to 3 moles of the cyclic urea being used for each molar equivalent of amide group in the polymer. Any one of the several solvents mentioned above may be used, but preferably the polymer and the methylolated cyclic urea are dissolved in water. Reaction is carried out at a pH of 2 to 5 and preferably about 3 and, as in the previous reaction procedures, the temperature may vary from about room temperature (around 25° C.) to 80° C. for a period of 1 to 16 hours, but the reaction is in any case terminated prior to the attainment of a gelled condition.

An alternate route to produce the polymers is to react a polymethylol polyacrylamide or a polymethylol polymethacrylamide either as a homopolymer or a copolymer with a cyclic urea of the types mentioned hereinabove. This is carried out at a pH of 2 to 5 and preferably around 3 at temperatures from room temperature to 80° C. for 1 to 16 hours as in the preceding system. The polymer or copolymer may be mixed with the cyclic urea as in the preceding system so that from 0.75 to 3 moles of the urea is present per molar equivalent of the methylolated acrylamide or methacrylamide units in the polymer.

The last two systems produce polymers directly. However, the monomers obtained by the reaction of a methylolacrylamide with the cyclic urea or from the reaction of an acrylamide with a methylolated cyclic urea may be polymerized. The polymerization may be effected simply in the solution of the monomer obtained by the reaction, in one of the solvents mentioned hereinabove, and especially water or dimethylformamide, of the acrylamide or methylolacrylamide with a methylolated cyclic urea or a cyclic urea respectively. The polymerization may be accelerated by incorporating from ½ to 3%, on the weight of the monomers, of a free radical initiator or catalyst, such as one of the peroxide catalysts, organic or inorganic, or an azo catalyst. Typical organic peroxide catalysts include benzoyl peroxide, acetyl peroxide, caproyl peroxide, butyl perbenzoate peroxide, and butyl hydroperoxide; also azo catalysts such as azodiisobutyronitrile, azodiisobutyramide, or diethyl azodiisobutyrate may be used. Peroxidic catalysts may be used in conjunction with a reducing agent, as in the redox system, such as with an alkali metal sulfite, bisulfite, metabisulfite, or hydrosulfite, or with hydrazine. Chain transfer agents or regulators, such as mercaptoethanol or other mercaptans, may be employed. If desired, polymerization may be effected by the bulk procedure, or when water-insoluble comonomers are employed, by an emulsion technique using an emulsifier for dispersing the water-insoluble monomers in the aqueous system in which polymerization is effected. Generally a temperature of 0° to 100° C. may be employed for polymerization and preferably a temperature from 40° to 75°.

The polymers may be isolated by the addition of a nonsolvent therefor, such as acetone. If desired, they may be purified by re-dissolving in a minimum amount of water or other solvent and re-precipitating by the addition of acetone or the like. Generally, the polymers are white, hard hygroscopic solids. The extent of hygroscopicity may be varied by varying the proportion of the monomer of the present invention and proportionately increasing or decreasing a water-insensitive comonomer.

The monomeric compounds of the present invention may be copolymerized with each other or with one or more other ethylenically unsaturated comonomers, such as acrylic and methacrylic acids, their esters, amides, salts, and nitriles, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazole, and allyl esters of monocarboxylic acids. Specific ethylenically unsaturated compounds are methyl, ethyl, isopropyl, butyl, tertbutyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tertbutylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free-radical polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

Interpolymerization may be effected in bulk, in solution, in emulsion, or in suspension. A wide range of compositions may be utilized. Copolymers are preferably constituted with 5% to 95% of one or more of the acrylamides of this invention. Even proportions up to 99% have been used where a minor variation in the polymeric amide is desired, while as little as 1% of these amides can in some cases influence the properties of a polymerized vinylidene compound. In general two sets of conditions are frequently encountered, one, where 1% to about 30% of an acrylamide of this invention is used to modify the nature of another kind of vinylidene polymer, and the other, where the polymers of the amides of this invention can be regarded as extended, diluted, or modified with 5% to 50% of another type of polymerizable compound.

The monomers of the present invention are useful chemical intermediates. For example, they react with tetradecyl or octadecyl mercaptan in the presence of an alkaline catalyst to form an alkylthio derivative, which can be applied to textile fabrics to provide water-repellency. Two moles of the above monomers react with one mole of hexamethylenediamine. The resulting product can be incorporated with urea or melamine, the mixture being then reacted with formaldehyde to give desirable resinous condensates. The above monomers are useful for impregnating leather, in which they diffuse into the cell walls, where they can be polymerized and permanently retained.

An unusual reaction of N-(β-methacrylamidomethyl)-N,N'-ethyleneurea is the formation of a monomeric methoxymethyl derivative. Such a reaction would, of course, be impossible with a monomer which is sensitive to acid. The other monomers of this invention can also be converted to methoxymethyl derivatives. Other alcohols, such as ethanol, propanol, butanol, and the like, may be used to replace the methanol. These alkoxymethyl monomers may be polymerized by free-radical catalysts and they may be copolymerized with other monoethylenically unsaturated monomers. One advantage of these alkoxymethyl monomers is that they may be used in polymerizations and copolymerizations where the later use of free formaldehyde might be difficult or impossible. Also, the necessity of removing excess free formaldehyde is avoided.

The polymers of the present invention, and especially copolymers containing from 5 to 30 mole percent of units derived from a compound of formula I above and from 95 to 70 mole percent respectively of an ester of acrylic or methacrylic acid with an alcohol having 1 to 18 carbon atoms, such as methyl acrylate, butyl acrylate or methacrylate, lauryl acrylate and so on, may be applied as an aqueous dispersion of about 5 to 20% concentration to fabrics of wool, dried thereon, and then heated to 240° F. to 350° F. for half a minute to fifteen minutes. The fabrics thereby obtained have reduced shrinkage on washing. Aqueous dispersions of similar emulsion copolymers may be pigmented and applied as coatings for textile fabrics, wood, metals, and especially for finishing leather.

In the following examples, which are illustrative of the invention, the parts are by weight unless otherwise specifically noted:

EXAMPLE 1

(a) In a glass reaction vessel equipped with a stirrer and a condenser are mixed 25.8 grams (0.3 mole) of N,N'-ethylene-urea, 40 ml. of water, about 0.1 gram of hydroquinone, and enough phosphoric acid to adjust the pH to 4.0 (potentiometric value). This mixture is heated to 50° C., and 10.1 grams (0.1 mole) of methylolacrylamide is added in portions during two hours at 50° C. After five additional hours heating at 50° C. the condensation mixture containing N-acrylamidomethyl-N,N'-ethyleneurea is transferred to a glass bottle.

(b) Mercaptoethanol (0.18 gram) and dimethyl azodiisobutyrate (0.1 gram) are added to the bottle. The solution is heated under nitrogen for sixteen hours at 65° C. There is obtained 75.9 grams of a very light yellow solution with a Gardner-Holdt viscosity of B+. The polymerization mixture is poured into 800 ml. of acetone in a glass vessel to precipitate the polymer. After removal of the acetone layer, the residue is dissolved in a small amount of water, reprecipitated with acetone, and dried for one day at 0.5 mm. Hg and room temperature to give 13.3 grams of an almost white hygroscopic solid. The Gardner-Holdt viscosity of a 33⅓% aqueous solution of this solid is F.

(c) The procedure of part (a) is repeated and the aqueous solution of the acrylamidomethyl-N,N'-ethyleneurea is diluted with water to a solids concentration of about 8%. Passage of a regenerated cellulose film in wet gel condition through this solution renders the film flexible on drying.

(d) The procedure of part (a) hereof is repeated replacing the N,N'-ethyleneurea with 0.3 gram mole of N,N'-trimethyleneurea.

(e) The solution of the condensation product, acrylamidomethyl-N,N'-trimethyleneurea of part (d) hereof is subjected to the polymerization conditions in accordance with part (b) hereof and a white, hygroscopic solid polymer is isolated. The resulting polymer is reacted in aqueous alkaline solution with 15 moles of ethylene oxide per mole equivalent of the polymer. Passage of a regenerated cellulose film in wet gel condition through an aqueous solution containing 4% of the ethylene oxide modified polymers and about 3% of glycerine renders the film soft and flexible after drying.

EXAMPLE 2

(a) A mixture (pH 4.0) of 25.8 grams (0.3 mole) of N,N'-ethyleneurea, about 0.1 gram of hydroquinone, 60 ml. of dimethylformamide, and 3 drops of concentrated hydrochloric acid in a glass vessel equipped with a stirrer and condenser is heated to 50° C. In a two-hour period, 10.1 grams (0.1 mole) of methylolacrylamide is added at 50° C. The reaction mixture is then heated for three hours at 50° C.

(b) The resulting solution is transferred to a glass bottle, and 0.2 gram of mercaptoethanol and 0.1 gram of dimethyl azodiisobutyrate are added. It is heated for sixteen hours at 65° C. yielding 99.5 grams of an almost colorless solution with a Gardner-Holdt viscosity of C—. This solution is poured into 800 ml. of acetone to precipitate the polymer. The acetone layer is poured off, and the residue is dissolved in water. Reprecipitation of the polymer with acetone and evaporation at room temperature and 0.5 mm. Hg for one day yields 15.9 grams of an almost white brittle hygroscopic solid.

EXAMPLE 3

(a) A similar experiment is carried out with 25.8 grams (0.3 mole) of N,N'-ethyleneurea, 60 ml. of methanol, about 0.1 gram of hydroquinone, enough concentrated hydrochloric acid to keep the pH of the reaction mixture at 2.0, and 10.1 grams (0.1 mole) of methylolacrylamide. The methylolacrylamide is added in three hours at 50° C. and the heating period is four hours at 50° C.

(b) For the polymerization reaction 0.2 gram of mercaptoethanol and 0.1 gram of dimethyl azodiisobutyrate are used. The polymerization mixture is 79.0 grams of almost colorless solution with a Gardner-Holdt viscosity of A–3. The polymeric product amounts to 17.1 grams of almost white brittle solid.

EXAMPLE 4

A solution of 3.38 grams (0.02 mole equivalent) of polyacrylamidomethyl-N,N'-ethyleneurea (obtained in Example 2) in 6.76 grams of water is added slowly to 8.23 grams (0.1 mole) of 36.5% aqueous formaldehyde in 15 grams of water at pH 8.5. The solution is heated at a pH of 8.5 for two hours at 65° C. The resulting solution containing polymethylol polyacrylamidomethyl-N,N'-ethyleneurea is introduced into an unbleached kraft pulp at a concentration of 0.5% polymer on pulp fibers along with 3% alum (on pulp fiber). The paper on ageing 28 days exhibits a wet strength of 11 lbs. per inch.

EXAMPLE 5

An aqueous solution of acrylamidomethyl-N,N'-ethyleneurea obtained as in Example 1 (a) is introduced into a reaction vessel. To this is added 4.93 grams (0.025 mole) of N-(β-methacrylamidoethyl)-N,N'-ethyleneurea, 0.3 gram of mercaptoethanol, and 0.1 gram of dimethyl azodiisobutyrate. The resulting solution is heated under nitrogen for sixteen hours at 65° C. producing, after isolation, a white copolymer useful for imparting wet strength to paper. The copolymer contains about 80 mole percent of the monomer of Example 1 (a).

EXAMPLE 6

The condensation reaction of methylolacrylamide with N,N'-ethyleneurea is carried out by the procedure of Example 2 (a) except that the pH is held at about 2.0.

The condensation mixture thereby obtained, 2.35 grams (0.011 mole) of N-(β-methacrylamidoethyl)-N,N'-ethylenthiourea, 0.2 gram of mercaptoethanol, and 0.1 gram of dimethyl azodiisobutyrate are heated together under nitrogen for sixteen hours at 65° C. to give 93.5 grams of a very light yellow solution with a Gardner-Holdt viscosity of F.

Isolation by the procedure described in Example 2 (b) yields 19.3 grams (100% conversion) of a white solid copolymer of about 90 mole percent acrylamidomethyl-N,N'-ethyleneurea and about 10 mole percent of N-(β-methacrylamidoethyl)-N,N'-ethylenethiourea.

EXAMPLE 7

(a) The condensation procedure of Example 3 (a) is repeated. To the resulting solution of the condensation product of methylolacrylamide with N,N'-ethyleneurea, there is added 4.3 grams (0.05 mole) of methyl acrylate, 0.2 gram of mercaptoethanol, and 0.1 gram of dimethyl azodiisobutyrate. The mixture is heated under nitrogen for sixteen hours at 65° C. There is obtained 116.2 grams of a very light yellow solution with a Gardner-Holdt viscosity of A–3.

Isolation by precipitation with acetone gives 20.9 grams (98.5% conversion) of an almost white solid copolymer containing approximately 66.7 mole percent of acrylamidomethyl-N,N'-ethyleneurea and about 33.3 mole percent of methyl acrylate.

(b) An aqueous solution is produced by the procedure of Example 1(a) containing ¼ gram mole of N-acrylamidomethyl-N,N'-ethyleneurea at a concentration of 10% by weight. Then 1 gram mole of n-butyl acrylate is added and emulsified by 2.5 grams of t-octylphenoxypolyethoxyethanol having about 12 oxyethylene units. Copolymerization is effected in the presence of 1 gram of diethyl azodiisobutyrate at a temperature of 65° C. Wool fabrics are passed through the copolymer dispersion, dried and heated 10 minutes at 300° C. The fabrics show a marked reduction in shrinkage on laundering.

EXAMPLE 8

(a) The pH of a mixture of 23.0 grams (0.2 mole) of 5-methyl-tetrahydro-s-triazone-2, 60 grams of water, and about 0.1 gram of hydroquinone is adjusted to 4.0 by addition of phosphoric acid. The mixture is heated to 50° C. in a glass vessel equipped with a condenser and stirrer. To this is added in two hours with stirring at 50° C. 10.1 grams (0.1 mole) of N-methylolacrylamide. The resulting solution is heated for eighteen hours at 50° C.

(b) The condensation mixture is transferred to a glass bottle, and 0.2 gram of mercaptoethanol and 0.1 gram of dimethyl azodiisobutyrate are added. The solution is heated under nitrogen for eighteen hours at 65° C.

The polymerization mixture is diluted with water, and calcium hydroxide is added to precipitate the phosphoric acid as calcium phosphate. The inorganic salts are removed by filtration, and the filtrate is concentrated. Acetone is then added to precipitate the polymer. After removal of the acetone layer, the residue is dissolved in water, reprecipitated with acetone, and dried for one day at a pressure of 0.5 mm. Hg and room temperature to give 25.7 grams of a tan extremely hygroscopic solid.

(c) The procedure of parts (a) and (b) is repeated with a 1.5:1 mole ratio of the triazone to methylolacrylamide.

(d) Each of the above products of parts (b) and (c) is condensed with an excess of aqueous formaldehyde at pH 8.5 to give solutions of the methylolated polymers. Rayon fabrics are passed through the solutions adjusted to 10% solids concentration, dried and heated to 300° F. for 10 minutes. Stiffened fabrics are thereby obtained.

EXAMPLE 9

The pH of a mixture of 9.92 grams (0.04 mole equivalent) of a 28.6% aqueous solution of polyacrylamide (Gardner-Holdt viscosity=I, prepared with 1% mercaptoethanol, 1% ammonium persulfate, and 0.33% of sodium hydrosulfite), 52.56 grams of water, and 17.52 grams (0.12 mole) of bis-methylol-N,N'-ethyleneurea is adjusted to 3.1 by addition of a few drops of concentrated sulfuric acid. The solution (80 grams) is divided into four approximately equal portions designated A1, A2, A3, and A4. These are then heated at 65° C.: A1 for two hours, A2 for four hours, A3 for five and one-half hours, and A4 for six and one-half hours. Each sample is removed from the oven at the end of the specified time and neutralized by addition of sodium hydroxide to pH 7.0. These solutions of polymethylol poly(acrylamidomethyl-N,N'-ethyleneurea) are introduced into unbleached kraft at a concentration of 1% resin solids on pulp weight along with 3% alum on pulp weight. After drying of the paper sheets formed therefrom, the wet strengths obtained are as in Table I:

Table I

| Polymer Solution | Wet Strength (lbs./inch) After 28 Days |
|---|---|
| A1 | 1.6 |
| A2 | 4.8 |
| A3 | 8.3 |
| A4 | 10.2 |

EXAMPLE 10

The pH of a mixture of 14.16 grams (.04 mole equivalent) of a 24.1% aqueous solution of polymethacrylamide (Gardner-Holdt viscosity=D, prepared with 1% mercaptoethanol, 1% ammonium persulfate, and 0.4% sodium hydrosulfite), 48.32 grams of water, and 17.52 grams (.12 mole) of bis(hydroxymethyl)-N,N'-ethyleneurea is adjusted to 2.5 (potentiometer) by addition of about 6 drops of concentrated sulfuric acid. The resulting 80 grams of solution is divided in three portions designated B1, B2, and B3. These are heated at 65° C. for varying times—two hours for B1, four for B2, and five for B3. At the end of the heating period, each sample is removed and neutralized to pH 7 by addition of 10% sodium hydroxide. The resulting solutions of polymethylol poly(methacrylamidomethyl-N,N'-ethyleneurea) are introduced into unbleached kraft at a concentration of 1% on pulp weight along with 3% alum on pulp weight. The dried paper sheets obtained therefrom have wet strengths as given in Table II.

Table II

| Polymer Solution | Wet Strength (lbs./inch) After 28 Days |
|---|---|
| B1 | 3.9 |
| B2 | 9.6 |
| B3 | 10.8 |

It is to be understood that changes and variations may be made without departing from the spirit and scope of the invention as defined in the appended claims.

We claim:

1. A composition of matter comprising a compound of the formula:

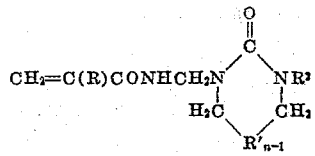

where R is selected from the group consisting of H and $CH_3$, $n$ is an integer having a value of 1 to 2, R' is selected from the group consisting of $-CH_2-$ and $-NR^3-$ where $R^3$ is selected from the group consisting of hydroxyethyl and alkyl groups of 1 to 4 carbon atoms, and $R^2$ is selected from the group consisting of H and $CH_2OH$ and $CH_2OCH_3$.

2. A composition of matter comprising an addition polymer of a compound as defined in claim 1.

3. A composition of matter comprising N-acrylamidomethyl-N,N'-ethyleneurea.

4. A composition of matter comprising N-acrylamidomethyl-N'-methylol-N,N'-ethyleneurea.

5. A composition of matter comprising N-methacrylamidomethyl-N,N'-ethyleneurea.

6. A composition of matter comprising an N-acrylamidomethyl-5-alkyl-tetrahydro-s-triazone-2 in which the alkyl group has 1 to 4 carbon atoms.

7. A composition of matter comprising an N-acrylamidomethyl-5-methyl-tetrahydro-s-triazone-2.

8. A composition of matter comprising N-acrylamidomethyl-N,N'-trimethyleneurea.

9. A composition of matter comprising an addition polymer of N-acrylamidomethyl-N,N'-ethyleneurea.

10. A composition of matter comprising an addition polymer of N-acrylamidomethyl-N'-methylol-N,N'-ethyleneurea.

11. A composition of matter comprising an addition polymer of an N-acrylamidomethyl-5-methyl-tetrahydro-s-triazone-2.

12. A method of producing a compound defined in claim 1 which comprises reacting a member selected from the group consisting of methylolacrylamide and methylolmethacrylamide with a compound selected from the group consisting of N,N'-ethyleneurea, N,N'-trimethyleneurea, and 5-alkyl-tetrahydro-s-triazone-2 in which the alkyl group has from 1 to 4 carbon atoms, the reaction being effected at an acid pH of about 2 to 5 and at a temperature from room temperature to about 80° C.

13. A method of producing a compound defined in claim 1 which comprises reacting a member selected from the group consisting of acrylamide and methacrylamide with a compound selected from the group consisting of methylolated N,N'-ethyleneurea, methylolated N,N'-trimethyleneurea, and methylolated 5-alkyl-tetrahydro-s-triazone-2 in which the alkyl group has from 1 to 4 carbon atoms, the reaction being effected at an acid pH of about 2 to 5 and at a temperature from room temperature to about 80° C.

14. A method of producing an addition polymer of a compound defined in claim 1 which comprises reacting an addition polymer of a member selected from the group consisting of methylolacrylamide and methylolmethacrylamide with a compound selected from the group consisting of N,N'-ethyleneurea, N,N'-trimethyleneurea, and 5-alkyl-tetrahydro-s-triazone-2 in which the alkyl group has from 1 to 4 carbon atoms, the reaction being effected at an acid pH of about 2 to 5 and at a temperature from room temperature to about 80° C.

15. A method of producing an addition polymer of a compound defined in claim 1 which comprises reacting an addition polymer of a member selected from the group consisting of acrylamide and methacrylamide with a compound selected from the group consisting of methylolated N,N'-ethyleneurea, methylolated N,N'-trimethyleneurea, and methylolated 5-alkyl-tetrahydro-s-triazone-2 in which the alkyl group has from 1 to 4 carbon atoms, the reaction being effected at an acid pH of about 2 to 5 and at a temperature from room temperature to about 80° C.

16. A method of producing an addition polymer of a compound defined in claim 1 which comprises polymerizing, in the presence of a free-radical initiator and at a temperature between 0° C. and 100° C., a condensate of a member selected from the group consisting of methylolacrylamide and methylolmethacrylamide with a compound selected from the group consisting of N,N'-ethyleneurea, N,N'-trimethyleneurea, and 5-alkyl-tetrahydro-s- triazone-2 in which the alkyl group has from 1 to 4 carbon atoms, the reaction being effected at an acid pH of about 2 to 5 and at a temperature from room temperature to about 80° C.

17. A method which comprises reacting an N-methylol substitution product of a compound selected from one of the following groups A and B with a compound selected from the other group, group A consisting of acrylamide, methacrylamide, and addition polymers thereof, and group B consisting of N,N'-ethyleneurea, N,N'-trimethyleneurea, and 5-alkyl-tetrahydro-s-triazone-2 in which the alkyl group has from 1 to 4 carbon atoms, said N-methylol groups when in one of the aforesaid polymers being substituted on the amide nitrogen of units of one of the aforesaid amides, the reaction being effected at an acid pH of about 2 to 5 and at a temperature from room temperature to about 80° C.

References Cited in the file of this patent
UNITED STATES PATENTS 2,727,016  Hankins et al. _____ Dec. 13, 1955